United States Patent
Starodoumov et al.

(10) Patent No.: US 8,373,924 B2
(45) Date of Patent: *Feb. 12, 2013

(54) FREQUENCY-TRIPLED FIBER MOPA

(75) Inventors: Andrei Starodoumov, Cupertino, CA (US); Norman Hodgson, Belmont, CA (US); Dmitri Simanovski, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/115,871

(22) Filed: May 25, 2011

(65) Prior Publication Data

US 2012/0300287 A1    Nov. 29, 2012

(51) Int. Cl.
G02F 1/35    (2006.01)
G02F 2/02    (2006.01)

(52) U.S. Cl. .............. 359/329; 359/328; 372/6; 372/22

(58) Field of Classification Search ........... 359/326–332; 372/6, 21, 22; 385/122
See application file for complete search history.

(56) References Cited

U.S. PATENT DOCUMENTS

| | | |
|---|---|---|
| 5,136,597 A | 8/1992 | Nightingale |
| 5,404,365 A | 4/1995 | Hiiro |
| 5,867,305 A | 2/1999 | Waarts et al. |
| 5,940,418 A | 8/1999 | Shields |
| 7,292,387 B2 | 11/2007 | Hoffman et al. |
| 7,469,081 B2 * | 12/2008 | Byer et al. ............... 385/27 |
| 7,920,606 B2 | 4/2011 | Starodoumov et al. |
| 2006/0222372 A1 | 10/2006 | Spinelli et al. |
| 2007/0211773 A1 | 9/2007 | Gerstenberger et al. |
| 2007/0263679 A1 | 11/2007 | Staroudoumov et al. |
| 2007/0263680 A1 | 11/2007 | Starodoumov et al. |
| 2011/0069376 A1 * | 3/2011 | Diening ............ 359/329 |

FOREIGN PATENT DOCUMENTS

EP    0605110 A2    7/1994

OTHER PUBLICATIONS

International Search Report and Written Opinion for PCT Patent Application No. PCT/US2009/065579, mailed on Feb. 5, 2010, 14 pages.
Starodoumov et al., "Hybrid fiber MOPA—bulk amplifier system for frequency conversion", Proceeding of Spie, vol. 6871, 2008, pp. 68710V.1-68710V.8.
Non Final Office Action for U.S. Appl. No. 12/335,015, mailed on Jun. 24, 2010, 11 pages.
Notice of Allowance for U.S. Appl. No. 12/335,015, mailed on Dec. 9, 2010, 7 Pages.

* cited by examiner

*Primary Examiner* — Daniel Petkovsek
(74) *Attorney, Agent, or Firm* — Morrison & Foerster LLP

(57) ABSTRACT

Fundamental-wavelength pulses from a fiber a laser are divided into three or more pulse portions and the three or more portions are separately amplified. Two or more of the amplified fundamental-wavelength pulse-portions are combined and frequency-doubled. The frequency doubled portion is sum-frequency mixed with one or more of the other amplified fundamental wavelength pulse-portions to provide third-harmonic radiation pulses.

9 Claims, 8 Drawing Sheets

FREQUENCY-TRIPLED FIBER MOPA

TECHNICAL FIELD OF THE INVENTION

The present invention relates in general to fiber lasers. The invention relates in particular to externally frequency-tripled fiber-MOPA (master oscillator plus power amplifier systems.

DISCUSSION OF BACKGROUND ART

Fiber lasers and amplifiers are increasingly used in applications that require compact and robust monolithic design, good stability and excellent beam quality. Fiber amplifiers exhibit much higher gain, typically between about 20 decibels (dB) and 40 dB, compared to solid-state amplifiers (typically between about 10 dB and 20 dB). This makes fiber master-oscillator plus power amplifier (fiber-MOPA) systems attractive for amplification of a small signal from a master oscillator to high average and peak powers.

A master oscillator (for example, semiconductor diode) can be easily modulated at high pulse repetition rate, for example, up to about 1 Gigahertz (GHz) while generating pulses with an arbitrary length, for example between about 0.1 nanoseconds (ns) and 10 microseconds (μs). This is one reason why fiber-MOPA systems offer better flexibility and choice in pulse lengths and pulse repetition rates than solid-state lasers.

Most fiber lasers operate at a wavelength in an infrared (IR) wavelength range. There is also, however, a growing demand for reliable compact pulsed laser sources in visible and ultra-violet (UV) spectral ranges. This could be satisfied by frequency converting the output of infrared-laser sources.

In general, a narrow linewidth (less than about 0.6 nm), linearly polarization, and high peak power, for example greater than about 1 kilowatt (kW) are required for efficient conversion of IR radiation into visible and UV range. However, conventional high power fiber-laser oscillators usually operate with broader linewidths, for example greater than about 1 nm. Further, high peak power required for efficient harmonic generation is limited by nonlinear effects in fibers such as stimulated Brillouin scattering (SBS), stimulated Raman scattering (SRS), and Four-Wave Mixing (FWM).

There is a need to overcome the above-discussed deficiencies in linewidth and amplification limitation in fiber-MOPA systems suitable for frequency conversion.

SUMMARY OF THE INVENTION

In one aspect of the present invention, optical apparatus comprises a fiber-MOPA. The fiber MOPA includes an arrangement for providing pulses of radiation having a fundamental wavelength, an arrangement for dividing the fundamental-wavelength pulses into N and M portions, and a corresponding N and M fiber-amplifiers for amplifying, respectively, the N and M fundamental-wavelength pulse-portions. N is at least two and M is at least one. An arrangement is provided for generating second-harmonic radiation pulses from the N amplified fundamental-wavelength pulse portions. An arrangement is provided for sum-frequency mixing the second-harmonic radiation pulses with the M amplified fundamental-wavelength pulse-portions to provide pulses of third-harmonic radiation. An arrangement is provided for excluding from the third-harmonic generation fundamental radiation residual from the second-harmonic generation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Eight preferred embodiments of the present invention are described hereinbelow. In each of the embodiments there is a fiber-MOPA having only one seed pulse source but having multiple output channels with one or more fiber amplifier stages in each of the output channels. The output of at least one of the channels is frequency-doubled in a first frequency-conversion stage. The frequency-doubled radiation is then sum-frequency mixed with the output of at least one other channel in a second frequency-conversion stage to provide third-harmonic radiation.

Providing amplification in each channel increases the total power available for the sum-frequency mixing over that which would be obtainable with only one output channel having one amplifier, recognizing that there is a limit, as described above, to how much amplification can be provided in a single channel without significant pulse-spectrum broadening. Using a pulsed laser seed source for the MOPA provides that pulses having a duration between about 0.1 ns and 1 μs can be provided for the frequency doubling and sum-frequency steps. As no residual fundamental radiation from the frequency-doubling step is required for the sum-frequency mixing step, frequency-doubling (second-harmonic generation) efficiency can be maximized. The embodiments differ from each other in the manner in which the frequency-doubling or sum-frequency mixing are effected and in the number of amplification channels provided. The terms "type-1" and "type-2" refer to the phase-matching type, as is known in the art.

Figure 1:
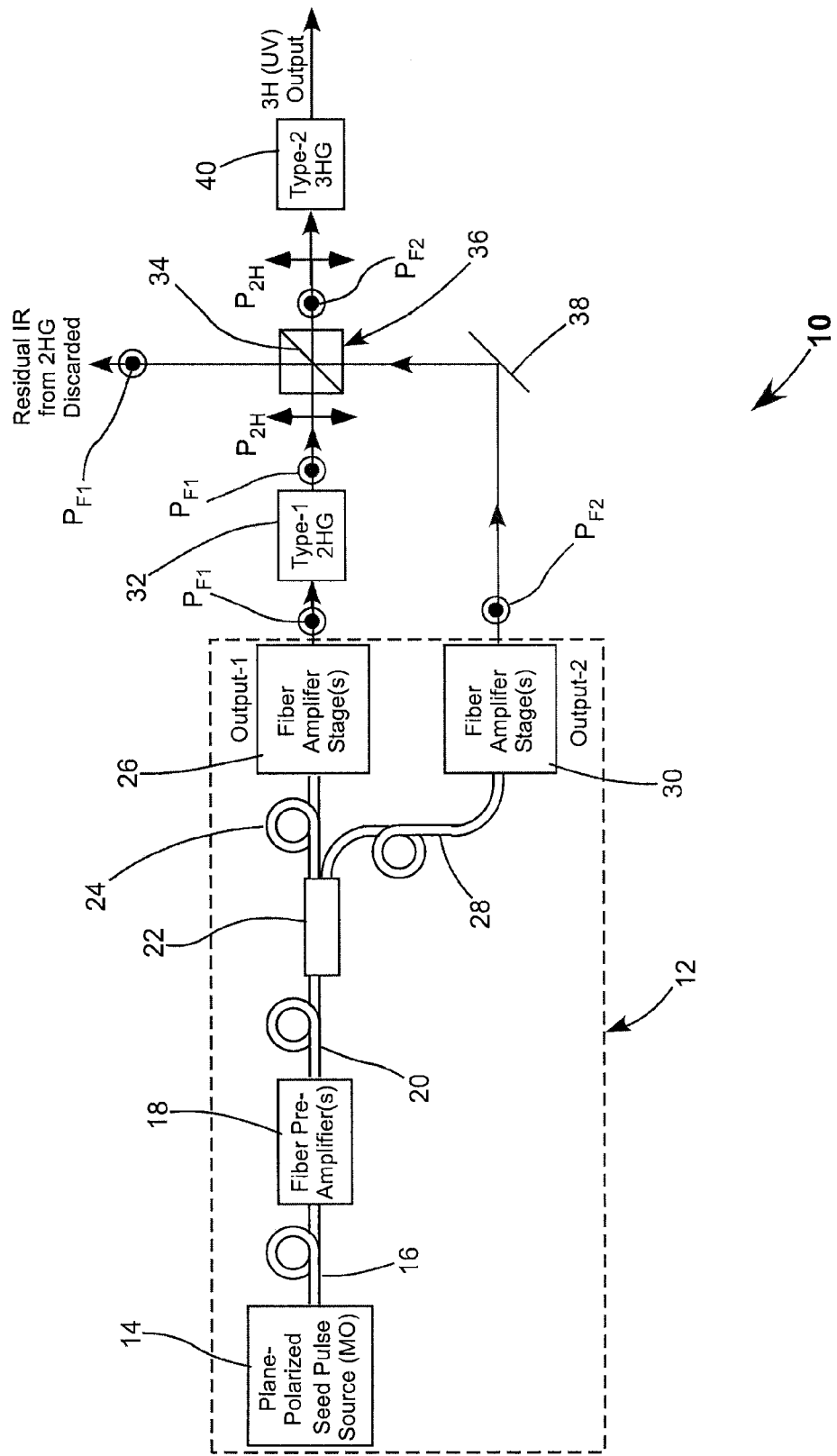
FIG. 1 schematically illustrates a first preferred embodiment of a frequency tripled fiber-MOPA in accordance with the present invention, wherein the fiber-MOPA has a plane-polarized seed-pulse source, and wherein the output of the seed-pulse source is divided into first and second portions each of which is subsequently amplified with the amplified first portion being type-1 frequency doubled, and with the frequency-doubled radiation being collinearly type-2 sum-frequency mixed with the amplified second portion of the fiber MOPA output to provide frequency-tripled radiation.

Referring now to the drawings, wherein like components are designated by like reference numerals, FIG. 1 schematically illustrates, in block diagram form, one preferred embodiment 10 of a frequency tripled fiber MOPA in accordance with the present invention. In this and all other drawings, fiber-optic connections between fiber optic components are depicted by looped double lines. Beams propagating in free-space are depicted by single lines. Polarization orientations of radiation are depicted either by a single "end-on" arrowhead (indicating horizontal polarization or polarization perpendicular to the plane of the drawing) or a double-headed arrow (indicating vertical polarization pr polarization parallel to the plane of the drawing). Polarization-orientations perpendicular and parallel to the plane of the drawings are referred to arbitrarily herein, for convenience of description, as horizontal and vertical polarization, respectively. Generally, the two orientations are orthogonal.

Continuing with reference to FIG. 1 frequency-tripled MOPA includes a seed pulse source 14, preferably a modulated diode-laser. The seed-pulse source is connected by an optical fiber 16 to one or more fiber pre-amplification stages 18. The output of the preamplifier stage or stages is connected by an optical fiber 20 to a splitter 22. Outputs of the splitter are connected by optical fibers 24 and 28 to fiber amplifiers 26 and 30, respectively, each thereof including one or more stages of amplification. It is assumed and preferred, here, that connecting fibers are polarization-maintaining fibers and the pre-amplifiers include polarization-maintaining gain fibers. In final stages of amplifiers 26 and 30 large mode area (LMA) fibers are preferred.

The output of seed-pulse source 14 is assumed to be horizontally polarized, and the output of each of amplifiers 26 and 30 is also horizontally polarized as indicated by arrowheads $P_{F1}$ and $P_{F2}$, respectively.

The fundamental radiation output (Output-1) of amplifier 26 is directed to a second-harmonic generator (2HG) 32 which includes an optically nonlinear crystal (not shown) arranged for type-1 second-harmonic conversion radiation. Second harmonic radiation from the type-1 2HG is polarized orthogonal to the input fundamental radiation, i.e., is vertically polarized, as indicated in by arrows $P_{2H}$. Preferably, the harmonic conversion in the 2HG is arranged for maximum conversion efficiency, with the crystal preferably being arranged to minimize Poynting vector walk-off between fundamental and 2H-radiations in the crystal of the 2HG. Poynting vector walk-off compensation for collinearly propagating beams is described in detail in U.S. Pat. No. 5,136,597 granted to John Nightingale, assigned to the assignee of the present invention, and the complete disclosure of which is hereby incorporated by reference. Conversion efficiency can be as high as about 80% depending on the fundamental wavelength and the material and configuration of the crystal selected.

As the conversion efficiency can never be 100%, residual fundamental radiation pass out of the second harmonic generator 32. The beam quality of this radiation will be poor, as the beam intensity on axis will have been depleted to an extent greater than the intensity is depleted off-axis by the second-harmonic conversion process. The quality will usually be sufficiently poor that this residual radiation is unsuitable for further frequency conversion. This residual fundamental radiation, being horizontally polarized, is directed out of fiber-MOPA 10 by reflection from a polarization selective reflecting surface 34 of a bi-prism 36. The 2H-radiation, being vertically polarized, is transmitted by surface 34.

The fundamental radiation output of amplifier 30 (Output-2) is directed via a mirror 38 to bi-prism 36 and is reflected from surface 34 thereof collinear with the 2H-radiation transmitted by surface 34. The collinear propagating fundamental and 2H-beams are directed to a third-harmonic generator (3HG) 40 which includes an optically nonlinear crystal (also not shown) arranged for type-2 sum-frequency mixing to generate third-harmonic (3H) radiation. For fundamental radiation having a wavelength between about 900 nm and 1100 nm, the third-harmonic radiation would have a wavelength in the UV region of the electromagnetic spectrum.

It should be noted that the division ratio of splitter 22 can be selected based on the gain of amplifiers 26 and 30 and the efficiency of the harmonic generators to minimize residual fundamental and 2H-radiation from the sum-frequency mixing stage. While there will always be some such residual radiation, this radiation can be separated from the 3H output by any well know means.

It should also be noted, in this and other embodiments described hereinbelow, that each the harmonic generators 32 and 40 would typically include relay optics to focus radiation into the optically nonlinear crystal therein and temperature and environmental controls for the crystal. A detailed description of such optics or controls is not required for understanding the principles of the present invention. Accordingly no such detailed description is presented herein.

It should further be noticed that throughout the various apparatuses describe the radiation is in the form of pulses, and for most effective third-harmonic generation, fundamental radiation pulses and second-harmonic radiation pulses should temporally overlap in the third-harmonic generator. This can be arranged by choosing appropriate optical paths for the second-harmonic radiation and fundamental-wavelength radiation pulses.

Figure 2:
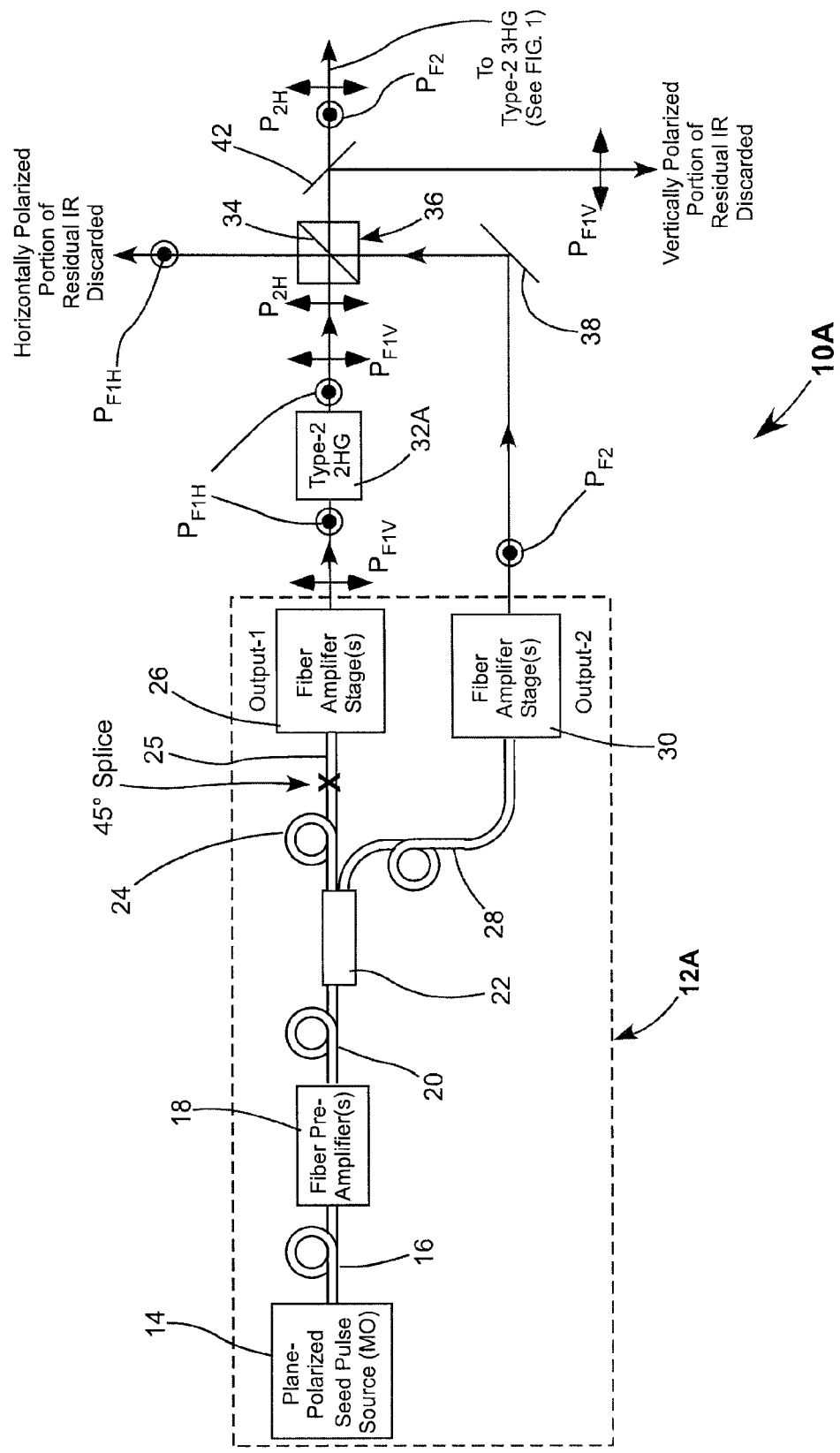
FIG. 2 schematically illustrates a second preferred embodiment of a frequency tripled fiber-MOPA in accordance with the present invention similar to the fiber-MOPA of FIG. 1 but wherein the amplified first portion of the seed pulse source output is type-2 frequency-doubled.

FIG. 2 schematically illustrates a second embodiment 10A of a frequency tripled fiber-MOPA in accordance with the present invention. Frequency-tripled fiber-MOPA 10A is similar to frequency-tripled fiber-MOPA 10 of FIG. 1 with exceptions as follows. In frequency-tripled fiber-MOPA 10A, fiber-MOPA 12A delivers from output-1 thereof fundamental radiation which includes both horizontally and vertically polarized components. This is effected by connecting the appropriate output of splitter 22 to amplifier 26 via polarization-maintaining optical fiber 24 and another polarization maintaining fiber 25 with axes thereof at an angle, for example 45°, to corresponding axes of polarization-maintaining fiber 24. This resolves the horizontally polarized radiation carried by fiber 24 into vertically and horizontally polarized components which are equally amplified by amplifier 26. These amplified components, designated respectively $P_{F1V}$ and $P_{F1H}$ in FIG. 2, are directed to a 2HG 32A which includes an optically nonlinear crystal (not shown) arranged for type-2 second-harmonic generation, with the 2H-radiation generated being vertically polarized as indicated by arrows P2H. Here again there will be residual fundamental radiation but in two polarization orientations. Horizontally polarized residual fundamental radiation will be directed out of the MOPA (discarded) by surface 34 of prism 36. If it is desired to discard the vertically polarized component, which will be transmitted by surface 34, before third-harmonic generation is effected, this can be done using a dichroic reflector 42. Type-2 third-harmonic generation takes place as described above with reference to frequency-tripled MOPA 10 of FIG. 1. One advantage of splitting radiation to be amplified between two polarization components is that above-described nonlinear effects can be reduced by up to about 17%. This helps to maintain a narrow spectral bandwidth signal which is optimum for frequency conversion.

One other option for creating two polarization components in output-1 is to rotate fiber-axes at about 45 degrees in a fiber coupled isolator (not shown), which typically separates amplification stages in a multi-stage fiber amplifier. Those skilled in the art may devise other methods without departing from the spirit and scope of the present invention.

Figure 3:
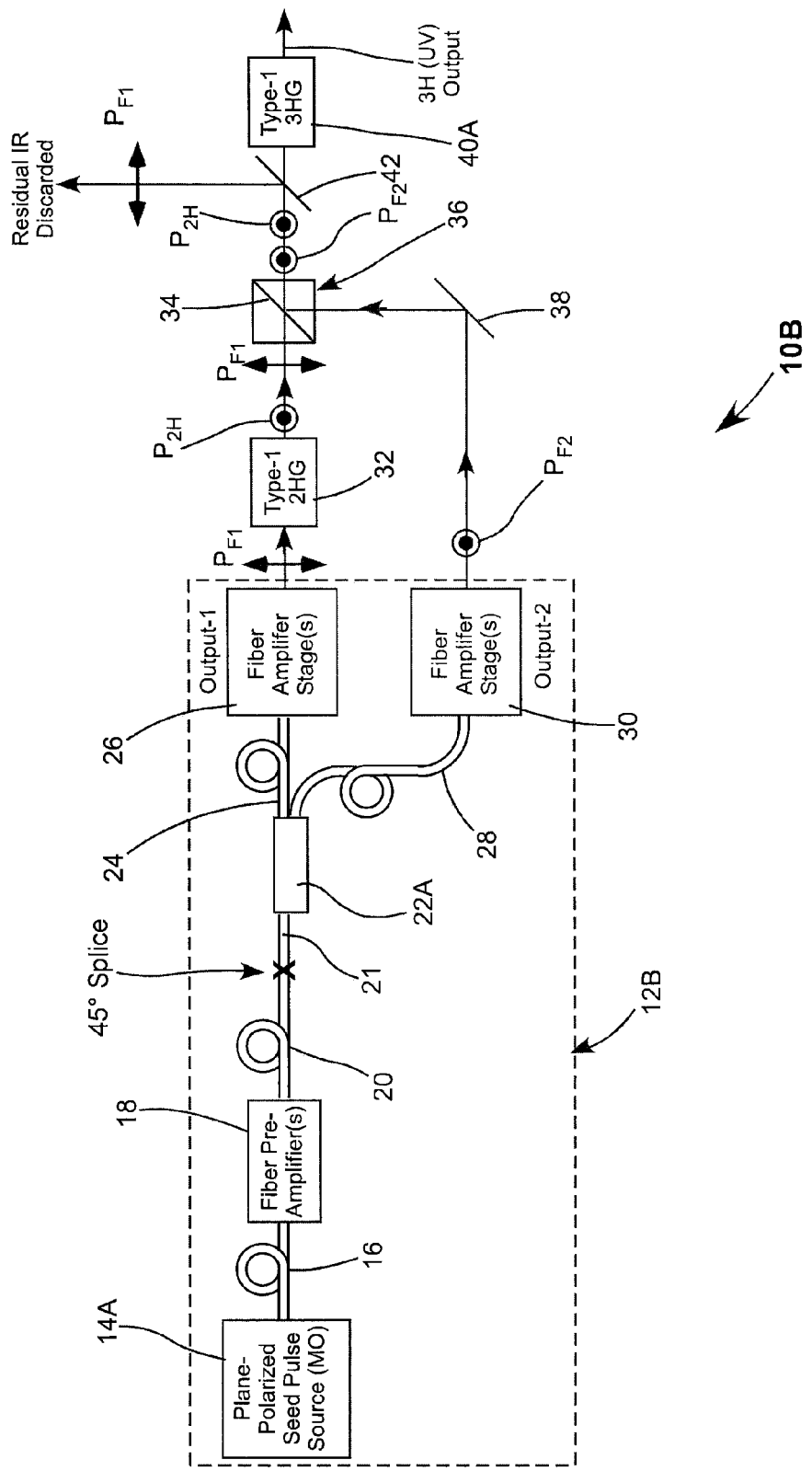
FIG. 3 schematically illustrates a third preferred embodiment of a frequency tripled fiber-MOPA in accordance with the present invention similar to the fiber-MOPA of FIG. 1 but wherein the seed pulse source output is un-polarized or elliptically polarized before being divided, and wherein the amplified first portion of the fiber-MOPA output is type-1 frequency-doubled and the sum-frequency mixing is type-1 sum-frequency mixing.

FIG. 3 schematically illustrates a third embodiment 10B of a frequency tripled fiber-MOPA in accordance with the present invention. Frequency-tripled fiber-MOPA 10A is similar to frequency-tripled fiber-MOPA 10 of FIG. 1 with exceptions as follows. In frequency-tripled fiber-MOPA 10B, fiber-MOPA 12B delivers from output-1 thereof fundamental radiation which is vertically polarized (see arrows $P_{F1}$), and delivers from output-2 thereof fundamental radiation which is horizontally polarized (see arrows $P_{F2}$). This is effected, here, by providing a 45°-splice between fibers 20 and 21 connecting pre-amplifier stage 18 to a fiber polarizing-splitter 22A. The splice provides two polarization components, as described above with reference to frequency-tripled MOPA 10A of FIG. 2, with the components being separated by splitter 22A. Those skilled in the art may derive other methods of providing orthogonally polarized outputs without departing from the spirit and scope of the present invention.

Second-harmonic generator 32 generates 2H-radiation by type-1 frequency-conversion (type-1 frequency-multiplication) with 2H radiation horizontally polarized as indicated by arrowhead $P_{2H}$. Surface 34 of bi-prism 36 must be configured here to transmit horizontally polarized 2H-radiation while being polarization-selective for fundamental radiation for reflecting radiation from output 2 of MOPA 12B. Accordingly, if it is necessary to discard fundamental radiation residual from 2HG 32, a separate dichroic element 42 must be provided. A third-harmonic generator 40A, including an optically nonlinear crystal (not shown) arranged for type-1 sum-frequency mixing, generates 3H-radiation from the identically plane-polarized fundamental and 2H-radiations.

Figure 4:
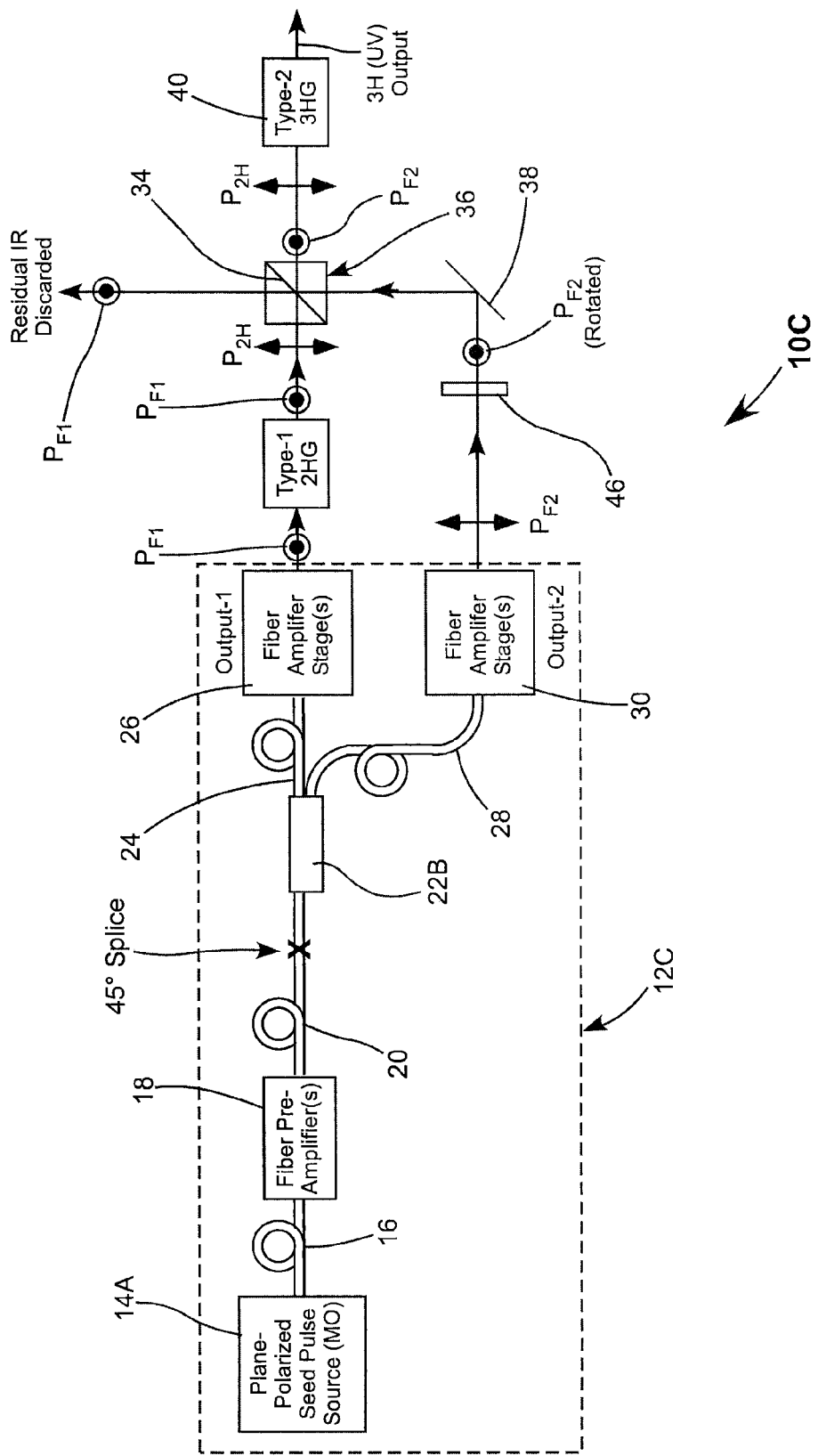
FIG. 4 schematically illustrates a fourth preferred embodiment of a frequency tripled fiber-MOPA in accordance with the present invention similar to the fiber-MOPA of FIG. 3 but wherein the sum-frequency mixing is type-2 sum-frequency mixing.

FIG. 4 schematically illustrates a third embodiment 10C of a frequency tripled fiber-MOPA in accordance with the present invention. Frequency-tripled fiber-MOPA 10C is similar to frequency-tripled fiber-MOPA 10B of FIG. 3 with the exception that a MOPA 12C of frequency-tripled fiber-MOPA 10C includes a fiber polarization splitter 22B configured such that fiber-MOPA 12C delivers from output-1 thereof fundamental radiation which is horizontally polarized (see arrows $P_{F1}$), and delivers from output-2 thereof fundamental radiation which is vertically polarized (see arrows $P_{F2}$). In this embodiment, 2H-radiation generated by 2HG 32 is vertically polarized (see arrows P2H) and is easily transmitted by surface 34 of bi-prism 36. Residual fundamental radiation is horizontally polarized is discarded by surface 34. The vertically polarized radiation from output-2 of MOPA 12C is rotated into a horizontally polarized orientation by a half-wave plate 46 and is reflected by surface 34 of bi-prism 36 collinear with the transmitted 2H-radiation. The transmitted 2H-radiation and reflected fundamental radiation are sum-frequency mixed by type-2 sum frequency mixing in 3HG 40.

Those skilled in the art will recognize that the arrangements similar to the arrangements of FIGS. 3 and 4 are possible, in which the plane-polarized seed-pulse source is replaced by an un-polarized or elliptically polarized seed-pulse source. In such an arrangement, of course, the 45-splice would be omitted. One such un-polarized seed pulse source could be a fiber laser pumped by a pulsed diode-laser source.

In all four embodiments of the present invention described above, 3H-generation is effected by delivering fundamental and 2H-radiation beams collinearly to crystal. The Poynting vector walk-off compensation disclosure of the above mentioned Nightingale patent is applicable to such 3H-generation in addition to 2H-generation. In a later U.S. Pat. No. 7,292,387, granted to Hoffman et al., the complete disclosure of which is hereby incorporated by reference, it is taught that walk-off compensation may be further enhanced by having orthogonally-polarized fundamental and 2H-radiation beams enter a suitably-cut crystal at an angle to each other. What is taught in the Nightingale patent is in fact a special case (where the angle is zero) of what is taught in the Hoffman et al. patent. In the Hoffman et al. patent, it is taught that collinearly propagating orthogonally plane-polarized residual-fundamental and generated-2H beams from a 2H-generation process can be caused to diverge from each other, and then converge on a 3H-generator at a selected angle for walk-off compensation, by locating a prism of a birefringent material between the 2H-generator and the 3H-generator.

In the frequency tripled MOPA of the present invention, the 3H-radiation is not generated from residual-fundamental radiation but from fundamental radiation direct from one output of a two-output fiber MOPA. Accordingly, the beam of 2H radiation and the fundamental radiation beam to be mixed are already separated, and can be directly converged into a 3H-generator arranged as described in the Hoffman et al patent. This permits at least a fifth embodiment of a frequency-tripled MOPA in accordance with the present invention, a description of which is set forth below with reference to FIG. 5.

Figure 5:
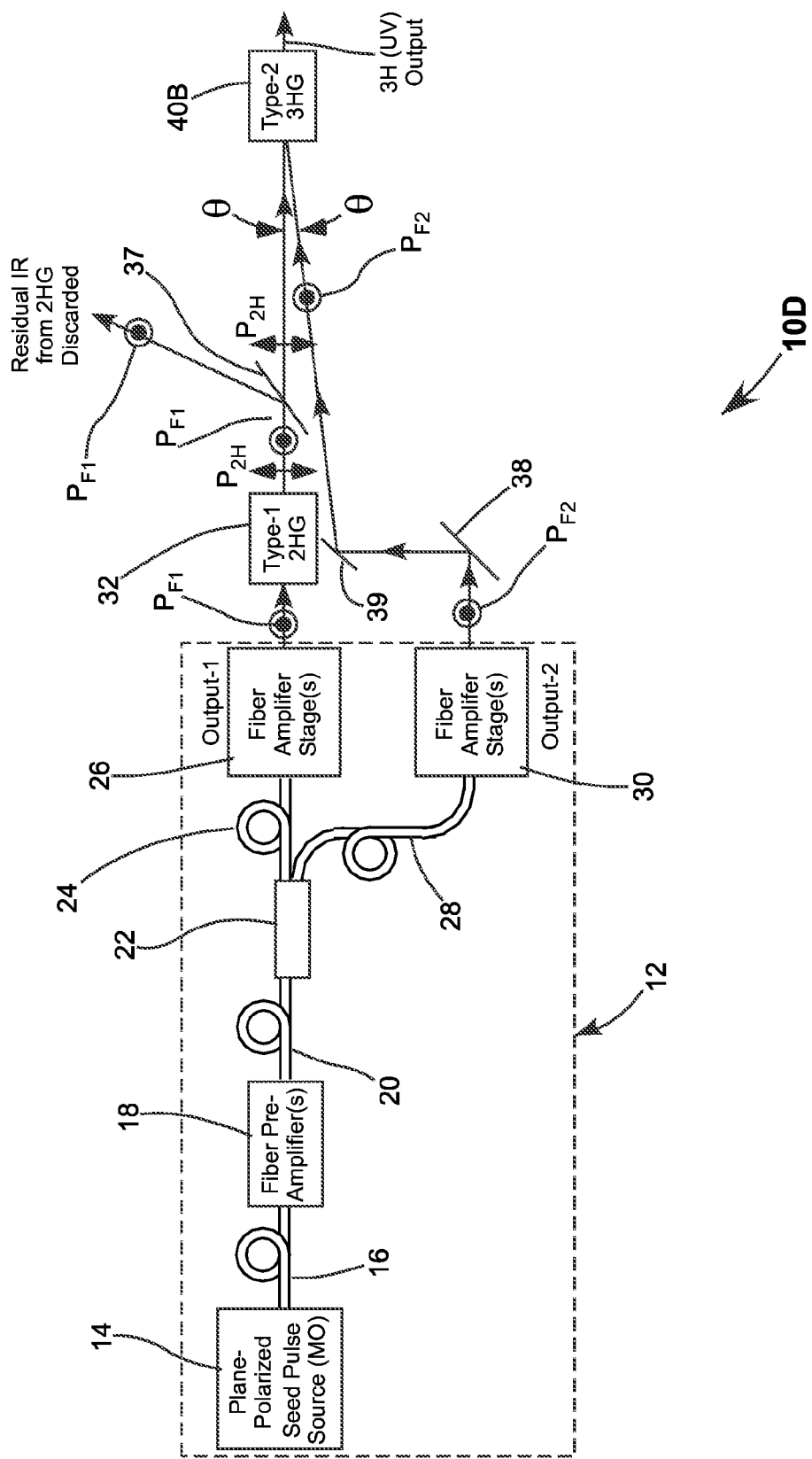
FIG. 5 schematically illustrates a fifth preferred embodiment of a frequency tripled fiber-MOPA in accordance with the present invention similar to the fiber-MOPA of FIG. 1 but wherein the type-2 sum-frequency mixing is non-collinear.

FIG. 5 depicts a frequency-tripled fiber MOPA 10D, which is similar to frequency-tripled fiber MOPA 10 of FIG. 1 except for the manner in which sum-frequency mixing is effected. Here, the polarizing bi-prism 36 of frequency-tripled fiber MOPA 10 is omitted and replaced by a dichroic filter 37 arranged to reflect the fundamental wavelength and transmit the second-harmonic radiation to a third-harmonic generator 40B which includes a nonlinear crystal arranged to accept converging fundamental and 2H beams as taught in the Hoffman et al. patent. Mirrors 38 and 39 direct the output of amplifier 30 of MOPA 12 into 3HG 40B at the angle θ selected for walk-off optimization. By way of example, for sum-frequency mixing 1064-nm radiation and 532-nm radiation in a crystal of lithium borate (LBO), one suitable value for θ is about 1°.

The arrangement of FIG. 5, in addition to providing a possible improvement in 3HG efficiency, eliminates the need for the beam combining arrangements of the frequency tripled MOPAs of FIGS. 1-4. This arrangement is not limited for use with the MOPA configuration of FIG. 1. Those skilled in the art may use this type-2 3HG arrangement with other separately-amplified two-output fiber MOPAs without departing from the spirit and scope of the present invention.

Figure 6:
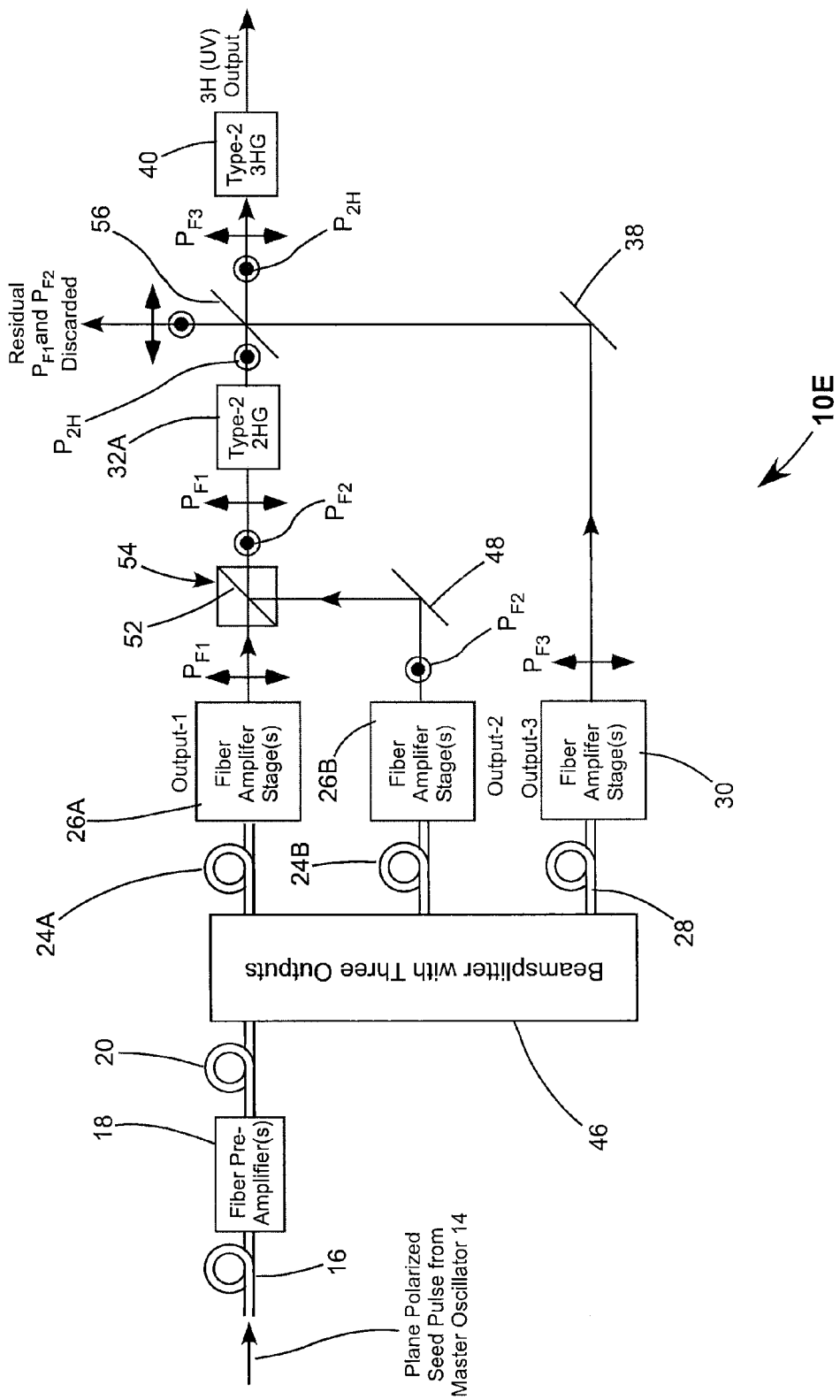
FIG. 6 schematically illustrates a sixth preferred embodiment of a frequency tripled fiber-MOPA in accordance with the present invention similar to the fiber-MOPA of FIG. 2 but wherein the output of the seed-pulse source is divided into first, second, and third portions each of which is subsequently amplified with the amplified first and second portions being polarization combined and type-2 frequency doubled, and with the frequency-doubled radiation being collinearly type-2 sum-frequency mixed with the amplified third portion of seed-pulse source MOPA output to provide frequency-tripled radiation.

FIG. 6 schematically illustrates a sixth preferred embodiment 10E of a frequency tripled fiber-MOPA in accordance with the present invention. Fiber-MOPA 10E is similar to the fiber-MOPA of FIG. 2 with an exception that the output of the seed-pulse portion of the fiber-MOPA is divided by a three-way beamsplitter 46 into first, second, and third portions (outputs 1, 2, and 3). Output-1 and output-2, having orthogonally opposed polarizations, are transmitted by fibers 24A and 24B respectively to a fiber amplifier or amplifier stages 26A and 26B respectively. The output of amplifier 26B is directed by turning mirror 48 to polarization-sensitive beam-combiner 54. The outputs of amplifiers 26A and 26B are then combined at surface 52 of beam-combiner 54. The combined amplified outputs are type-2 frequency doubled by an optically nonlinear crystal 32A. Output-3 is transmitted by a fiber 28 to a fiber amplifier or amplifier stages 30.

Turning-mirror 38 directs the output of amplifier stages 30 to a dichroic beam-combiner 56. Dichroic beam combiner 56 is highly transparent for second-harmonic radiation 2H and highly reflective for fundamental radiation in both P- and S-Polarization orientations. Fundamental radiation residual from the type-2 second-harmonic generation in optically nonlinear crystal 32A is reflected out of MOPA 10E by dichroic combiner 56. 2H-radiation transmitted by the dichroic combiner is combined with amplified fundamental radiation from Output-3 of beamsplitter 46 and converted to third-harmonic (3H) radiation by type-2 sum-frequency mixing to provide 3H-output of the fiber-MOPA.

Figure 7:
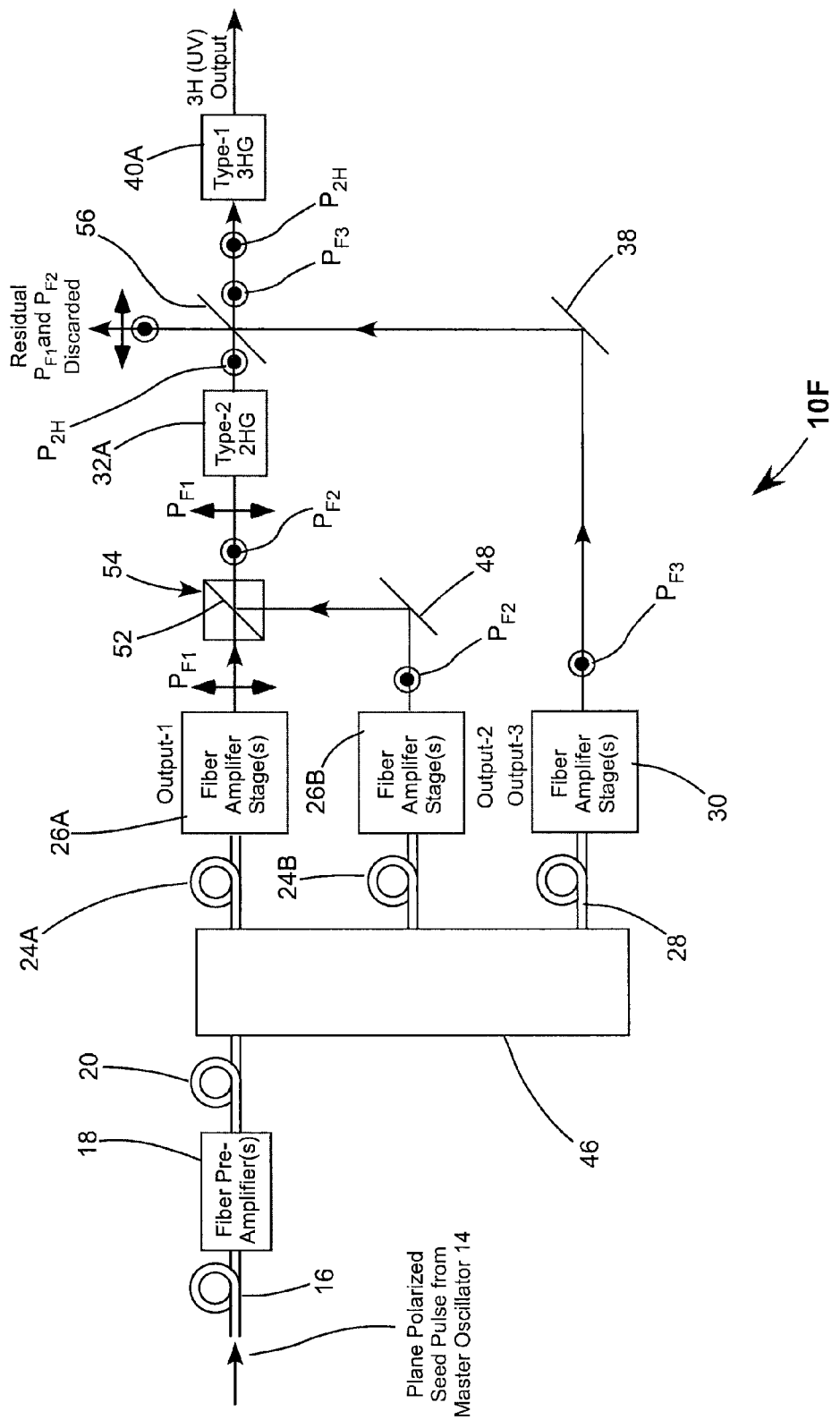
FIG. 7 schematically illustrates a seventh preferred embodiment of a frequency tripled fiber-MOPA in accordance with the present invention similar to the fiber-MOPA of FIG. 6 but wherein the frequency-doubled radiation is collinearly type-1 sum-frequency mixed with the amplified third portion of the seed-pulse source output to provide frequency-tripled radiation.

FIG. 7 schematically illustrates a seventh preferred embodiment 10F of a frequency tripled fiber-MOPA in accordance with the present invention. Fiber-MOPA 1 OF is similar to the fiber-MOPA 10E of FIG. 6 with an exception that 3H generation is achieved by type-1 sum-frequency mixing in an optically nonlinear crystal 40A.

Figure 8:
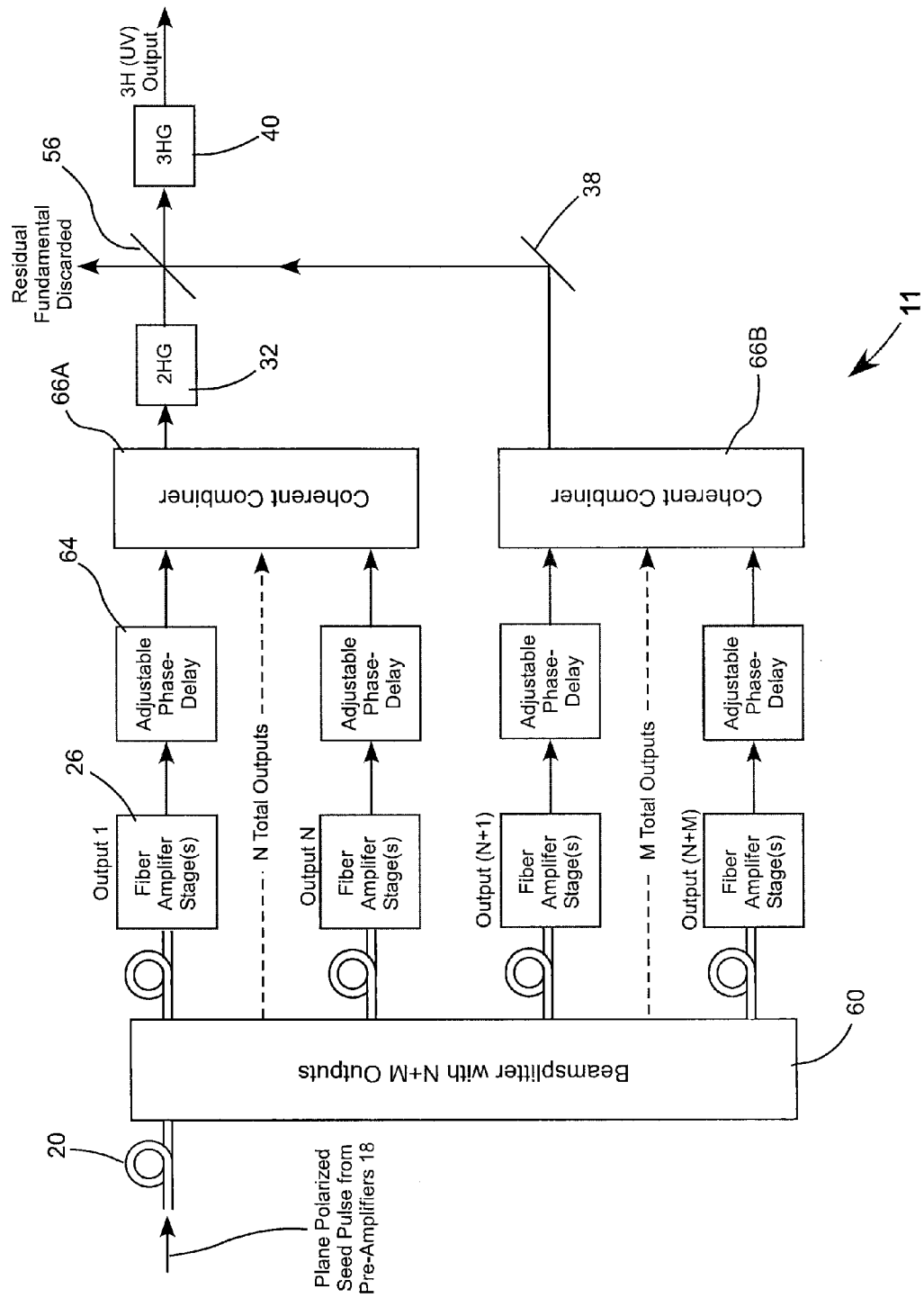
FIG. 8 schematically illustrates an eighth preferred embodiment of a frequency-tripled fiber MOPA in accordance with the present invention wherein the fiber-MOPA has a plane-polarized seed-pulse source, and wherein the output of the seed-pulse source is divided into a plurality of first and second portions each of which is subsequently amplified with the amplified first portions being combined and frequency doubled, and with the frequency-doubled radiation being collinearly sum-frequency mixed with combined amplified second portions of the seed-pulse source to provide frequency-tripled radiation.

FIG. 8 schematically illustrates an eighth preferred embodiment 11 of a frequency-tripled fiber MOPA in accordance with the present invention. This is similar to other embodiments described above but is configured for a greater number of amplification channels. In fiber-MOPA 11, the pre-amplified seed pulse from amplifier(s) 18 is divided by a beamsplitter 60 into a plurality M+N of outputs. Each of the outputs is amplified by a corresponding fiber-amplifier stage or stages 26 and subject to a corresponding adjustable phase-delay 64. A plurality N of the amplified outputs is combined by a coherent beam-combiner 66A, and a plurality M of the outputs is combined by a coherent beam-combiner 66B.

The coherent beam-combiners are preferably of a type known in the art which includes a chain of polarization-sensitive beam combiners interspersed with fractional-wave plates. The outputs to be combined are plane polarized with a first two thereof having polarization planes orthogonal to each other. Adjustable phase-delays 64 are adjusted such that the first combiner combines the beams with a phase-relationship which causes the output of the beam combiner to be elliptically polarized. A fractional-wave plate associated with the beam-combiner is configured to convert the elliptically polarized combined beam into a plane-polarized beam. This plane-polarized beam can be combined with another plane polarized beam (orthogonally oriented) in the same manner and the process is repeated a number of times corresponding to the number of amplification channels. A detailed description of this type of coherent beam-combiner is provided in U.S. Pat. No. 5,404,365, the complete disclosure of which is hereby incorporated herein by reference.

The output of beam-combiner 66A can be circularly polarized or plane-polarized, with second-harmonic generation (2HG) in an optically nonlinear crystal 32 being respectively type-2 or type-1. The output of beam-combiner combiner 66B is preferably plane-polarized. This combined, plane-polarized fundamental output is sum-frequency is reflected from mirror 38 and dichroic mirror 56 and mixed with second-harmonic radiation from crystal 32 in an optically nonlinear crystal 40. The sum frequency mixing can be either type-1 or type-2 as discussed above with reference to other embodiments of the invention. Assuming the power output of all fiber amplifier stages 26 is about equal, efficient 3HG-efficiency in crystal 40 occurs when N is greater than or equal to two-times M.

In summary, the present invention is described above in terms of preferred embodiments. The invention is not limited, however, to the embodiments described and depicted herein. Rather, the invention is defined by the claims appended hereto.

What is claimed is:

1. Optical apparatus, comprising:
   a fiber-MOPA, the fiber MOPA including an arrangement for providing pulses of radiation having a fundamental wavelength, an arrangement for dividing the fundamental-wavelength pulses into N and M portions, and a corresponding N and M fiber-amplifiers for amplifying respectively the N and M fundamental-wavelength pulse-portions, where N is at least two and M is at least one;
   an arrangement for generating second-harmonic radiation pulses from the N amplified fundamental-wavelength pulse portions;
   an arrangement for sum-frequency mixing the second-harmonic radiation pulses with the M amplified fundamental-wavelength pulse-portions to provide pulses of third-harmonic radiation; and
   an arrangement for excluding from the third-harmonic generation fundamental radiation residual from the second-harmonic generation.

2. The apparatus of claim 1, wherein N is two and M is one.

3. The apparatus of claim 1, wherein N is greater than two and M is greater than one.

4. The apparatus of claim 3, wherein the N amplified fundamental wavelength pulse-portions are coherently combined in a first coherent beam-combiner before the second-harmonic generation, and the M amplified fundamental-wavelength pulse-portions are coherently combined in a second coherent beam-combiner before the third-harmonic generation.

5. The apparatus of claim 3, wherein N is greater than or equal to two-times M.

6. A method of generating third harmonic pulses comprising the steps of:
   generating fundamental laser pulses from a fiber master oscillator;
   splitting each of the pulses along at least first, second and third propagation channels;
   amplifying the fundamental pulses in the first, second, and third channels;

combining the amplified fundamental pulses from the first and second channels;
frequency converting the combined amplified fundamental pulses from the first and second channels into second harmonic pulses;
combining the frequency converted pulses from the first and second channels with the amplified fundamental pulses from the third channel;
sum frequency mixing the combined second harmonic pulses from the first and second channels with the amplified fundamental pulses of the third channel to generate third harmonic pulses; and
excluding from the sum frequency mixing step, residual fundamental radiation from the frequency converting step.

7. A method as recited in claim 6 wherein the frequency conversion step is type-2 and the sum frequency mixing step is type-2.

8. A method as recited in claim 6 wherein the frequency conversion step is type-2 and the sum frequency mixing step is type-1.

9. A method as recited in claim 6 further including the step of adjusting the phase delay of the pulses in each of the channels to facilitate the polarization combining of the pulses from the channels.

* * * * *